United States Patent
He et al.

(10) Patent No.: US 10,915,726 B2
(45) Date of Patent: Feb. 9, 2021

(54) DISPLAY DEVICE AND BIOMETRIC DETECTION METHOD THEREOF

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 187 days.

(21) Appl. No.: 15/703,980

(22) Filed: Sep. 13, 2017

(65) Prior Publication Data
US 2019/0042823 A1 Feb. 7, 2019

Related U.S. Application Data

(60) Provisional application No. 62/540,576, filed on Aug. 3, 2017.

(51) Int. Cl.
| | | |
|---|---|---|
| *G06K 9/00* | (2006.01) | |
| *G06F 21/32* | (2013.01) | |
| *G06F 3/042* | (2006.01) | |
| *H01L 51/50* | (2006.01) | |
| *H01L 27/32* | (2006.01) | |

(52) U.S. Cl.
CPC ......... *G06K 9/0004* (2013.01); *G06F 3/0421* (2013.01); *G06F 21/32* (2013.01); *H01L 27/3234* (2013.01); *H01L 51/50* (2013.01)

(58) Field of Classification Search
CPC ............. G06K 9/0004; G06K 9/00912; G09G 2320/064; G09G 2354/00; G09G 3/3406; H01L 27/3211; H01L 27/323
See application file for complete search history.

(56) References Cited

U.S. PATENT DOCUMENTS

| | | | | |
|---|---|---|---|---|
| 2002/0150284 | A1* | 10/2002 | Iwai ..................... | G06K 9/0004 382/124 |
| 2004/0252867 | A1* | 12/2004 | Lan ...................... | G06K 9/0004 382/124 |
| 2008/0278459 | A1* | 11/2008 | Yamashita ........... | G06K 9/0004 345/175 |
| 2015/0364107 | A1* | 12/2015 | Sakariya ............... | G06F 3/0412 345/174 |
| 2016/0110025 | A1* | 4/2016 | Hossu ................... | G06F 3/0412 382/124 |
| 2018/0060641 | A1* | 3/2018 | Kim .................... | G06K 9/00013 |
| 2019/0042825 | A1* | 2/2019 | He ....................... | G06K 9/0004 |

FOREIGN PATENT DOCUMENTS

| | | |
|---|---|---|
| TW | 201122624 A | 7/2011 |
| TW | 201216138 A | 4/2012 |
| TW | 201227465 A | 7/2012 |

* cited by examiner

*Primary Examiner* — Kim Y Vu
*Assistant Examiner* — Michael J Vanchy, Jr.
(74) *Attorney, Agent, or Firm* — CKC & Partners Co, LLC

(57) ABSTRACT

A display device is provided. The display device includes a display panel having a biometric detecting area configured to detect a biometric pattern of a biometric object in a blanking period of the display device. The biometric detecting area has plural blocks and each of the blocks comprises plural first pixels and plural photodetectors adjacent to the first pixels, respectively. The light sequentially penetrates the first pixels within each of the blocks in the blanking period of the display device.

17 Claims, 7 Drawing Sheets

FIG. 5

DISPLAY DEVICE AND BIOMETRIC DETECTION METHOD THEREOF

RELATED APPLICATIONS

Field of Invention

This application claims priority to U.S. Provisional Application Ser. No. 62/540,576, filed Aug. 3, 2017, which is herein incorporated by reference.

BACKGROUND

Field of Invention

The present invention relates to a display device. More particularly, the present invention relates to a display device and a biometric detection method thereof.

Description of Related Art

In recent years, the fingerprint recognition technology has been widely used in mobile devices such as smartphones, tablet PCs, and laptop computers. A fingerprint recognition device configured to capture fingerprint images of a user's finger is generally classified into a capacitive type and an optical type. A sensing manner of the optical fingerprint recognition technology is emitting light onto a finger and receiving the reflected light and constructing a fingerprint image in accordance with the shape of the valleys or ridges of the finger. Therefore, it is important to avoid receiving the undesired reflected light which may cause signal interference.

SUMMARY

The present invention provides a display device. The display device includes a display panel having a biometric detecting area configured to detect a biometric pattern of a biometric object in a blanking period of the display device. The biometric detecting area has plural blocks and each of the blocks comprises plural first pixels and plural photodetectors adjacent to the first pixels, respectively. The light sequentially penetrates the first pixels within each of the blocks in the blanking period of the display device.

BRIEF DESCRIPTION OF THE DRAWINGS

The invention can be more fully understood by reading the following detailed description of the embodiment, with reference made to the accompanying drawings as follows:

FIG. 5 is a schematic view of the biometric detecting area of the display panel of the display device according to the embodiment of the present invention.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
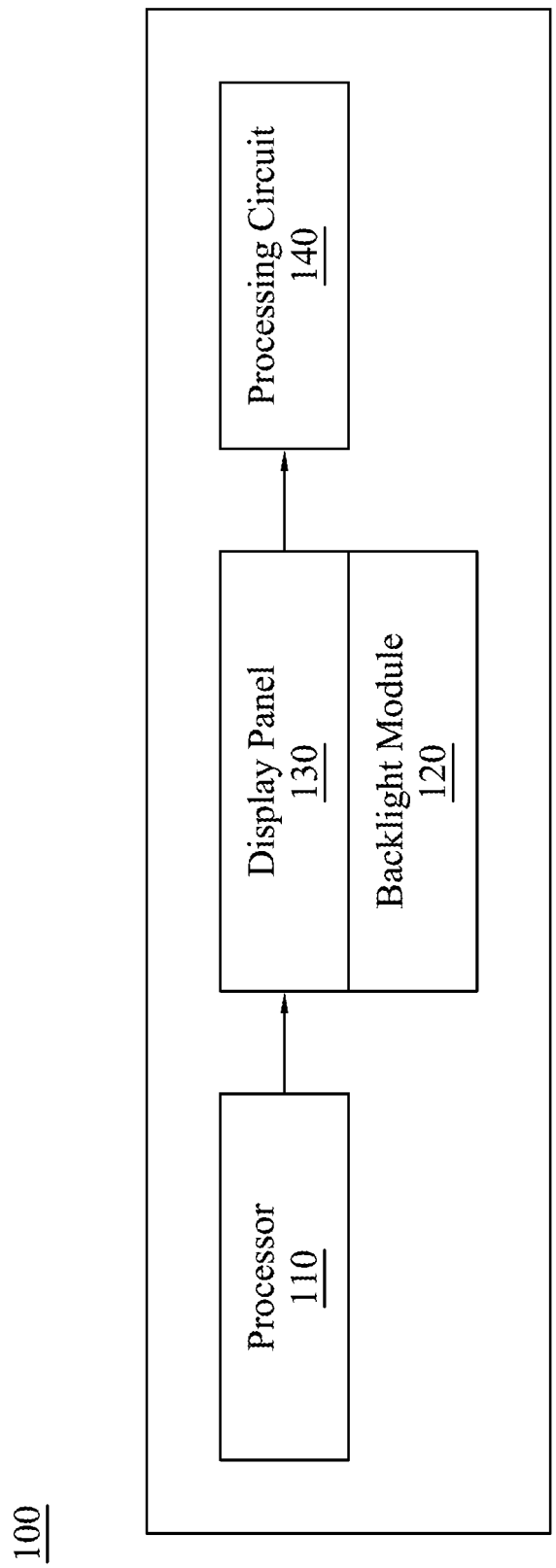
FIG. 1 is a block diagram of a display device according to an embodiment of the present invention.

FIG. 1 is a block diagram of a display device 100 according to an embodiment of the present invention. The display device 100 includes a processor 110, a backlight module 120, a display panel 130, and a processing circuit 140. The display panel 130 is electrically connected to the processor 110. The backlight module 120 is configured to provide backlight of the display panel 130, such that the display panel 130 displays an image in a display period of the display device 100. The processing circuit 140 is electrically connected to the display panel 130.

Figure 2:
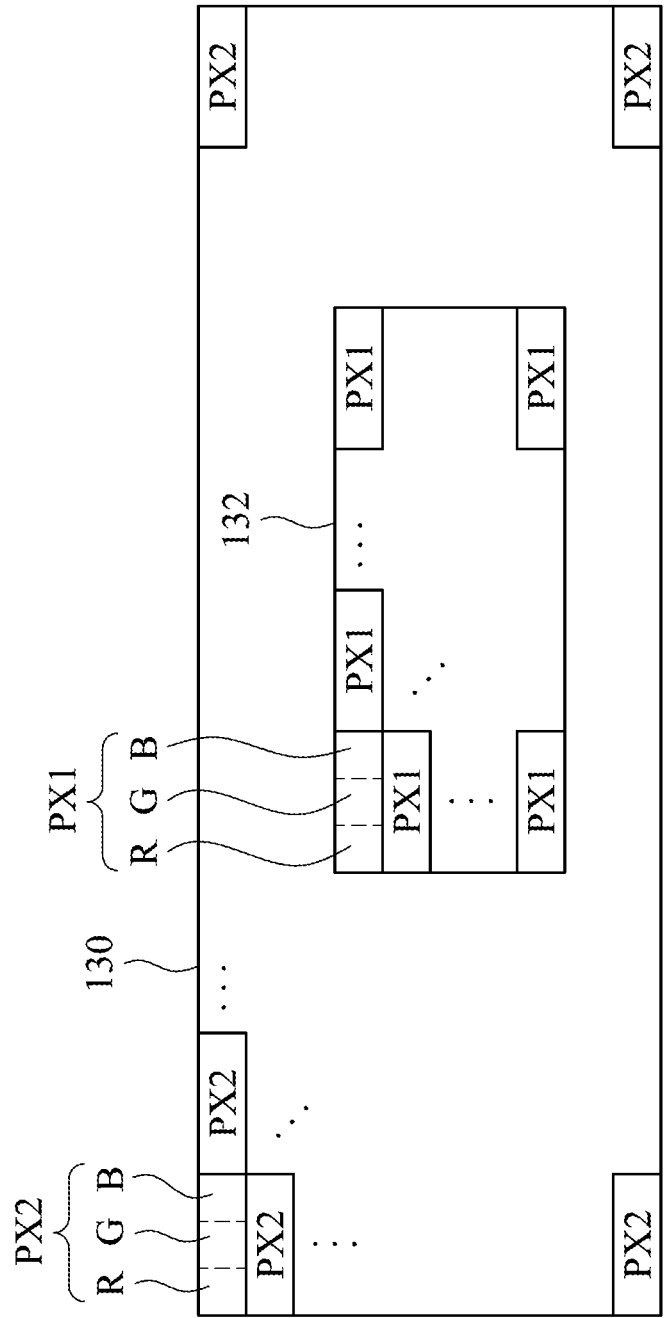
FIG. 2 is a top view of the display panel of the display device according to the embodiment of the present invention.

FIG. 2 is a top view of the display panel 130 of the display device 100 according to the embodiment of the present invention. The display panel 130 has a biometric detecting area 132 configured to detect a biometric pattern of a biometric object in a blanking period of the display device 100. In this embodiment, the biometric object is a finger and the biometric pattern is a fingerprint of the finger. In this embodiment, a size of the biometric detecting area 132 is smaller than a size of the display panel 130, but embodiments of the present invention are not limited thereto. In another embodiment, the size of the biometric detecting area 132 is equal to the size of the display panel 130.

As shown in FIG. 2, the display panel 130 includes plural first pixels PX1 located inside the biometric detecting area 132 and plural second pixels PX2 located outside the biometric detecting area 132. Each of the first pixels PX1 includes three subpixels, such as a red subpixel R, a green subpixel G, and a blue subpixel B. Each of the second pixels PX2 includes three subpixels, such as a red subpixel R, a green subpixel G, and a blue subpixel B. The light provided by the backlight module 120 (not shown) penetrates the first pixels PX1 and the second pixels PX2, thereby displaying the image in the display period of the display device 100.

Figure 3:
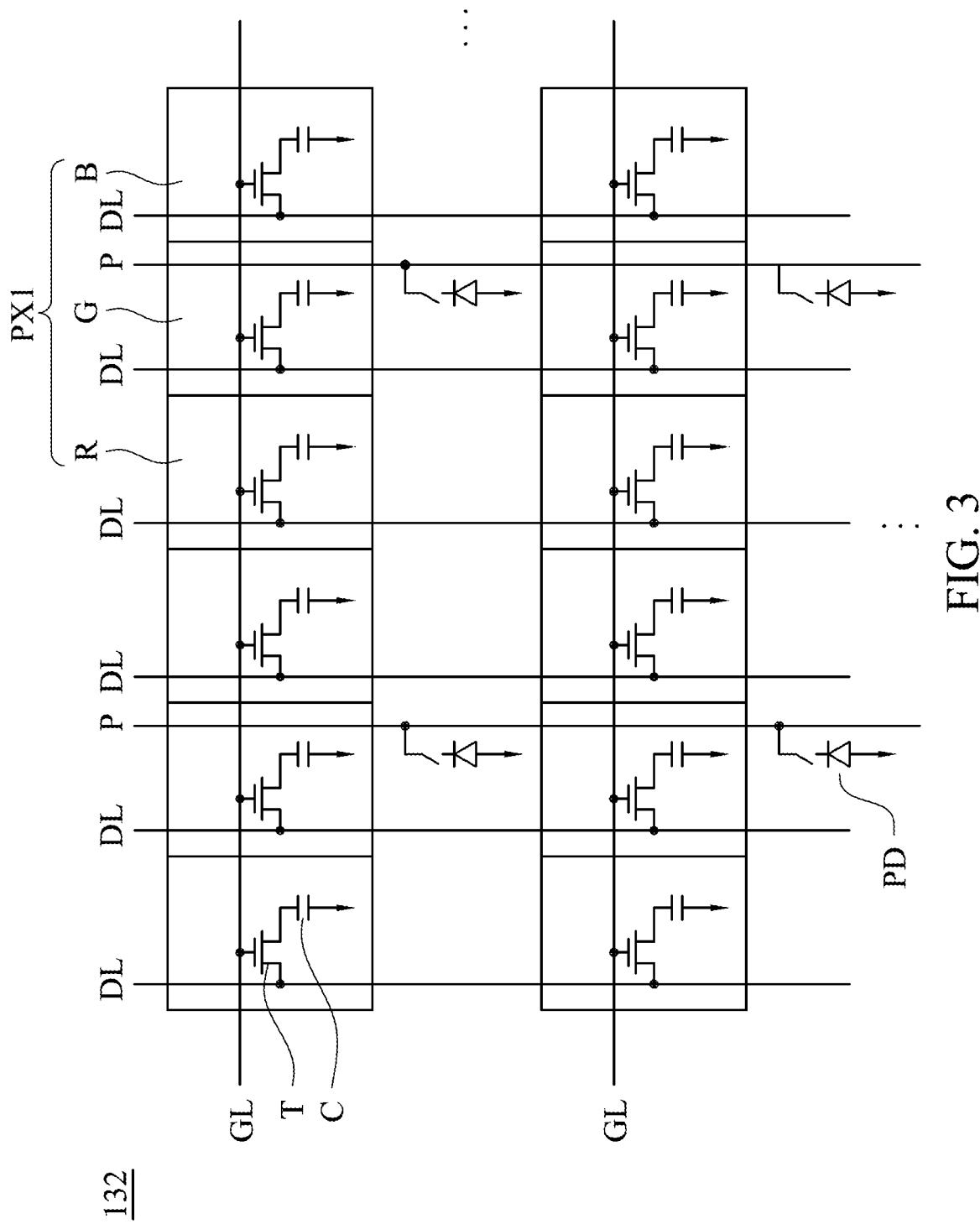
FIG. 3 is a circuit diagram of the biometric detecting area of the display panel of the display device according to the embodiment of the present invention.

FIG. 3 is a circuit diagram of the biometric detecting area 132 of the display panel 130 of the display device 100 according to the embodiment of the present invention. There are plural photodetectors PD disposed adjacent to the first pixels PX1, respectively. Specifically, the photodetectors PD are disposed within plural openings existing between the first pixels PX1 located in adjacent rows. Each of the subpixels of the first pixels PX1 includes a transistor T. The drain and the gate of each of the transistors T are electrically connected to a data line DL and a gate line GL, respectively. The source of each of the transistors T is connected to the reference ground through a capacitor C. Each of the photodetectors PD is selectively connected to a sensing line P. Specifically, each of the photodetectors PD is electrically connected to the sensing line P in the blanking period of the display device 100.

Figure 4:
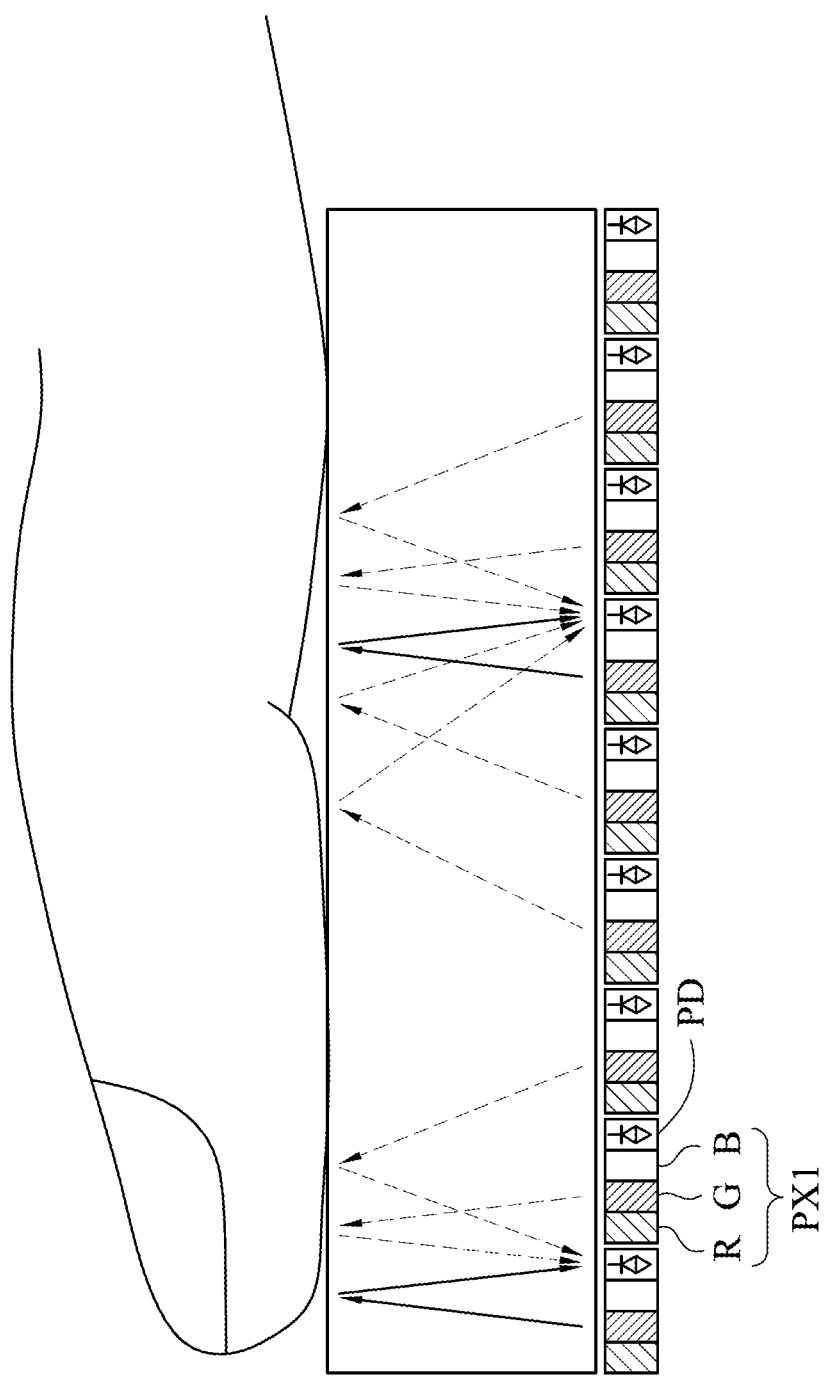
FIG. 4 is a sensing schematic diagram configured to explain the present invention.

FIG. 4 is a sensing schematic diagram configured to explain the present invention. In the blanking period of the display device 100, the light provided by the backlight module 120 (not shown) penetrates the first pixels PX1 and is reflected by the biometric object, and then the reflected light is received by the photodetectors PD. Each of the photodetectors PD converts the received reflected light into a photo detection signal. The biometric object, such as the finger, has an uneven reflecting surface, and thus the amounts of the reflected light received by different photodetectors PD may be different. Therefore, the processing circuit 140, as shown in FIG. 1, coupling to the photodetectors PD constructs the biometric pattern based on the photo detection signals.

As shown in FIG. 4, the light received by the photodetectors PD includes the desired light (i.e., the solid lines of FIG. 4) and the undesired light (i.e., the dotted lines of FIG. 4). The desired light of a target photodetector PD is emitted by the light penetrating the first pixel PX1 corresponding to the target photodetector PD. The undesired light of the target photodetector PD is emitted by the light penetrating the first pixels PX1, which do not correspond to the target photodetector PD. Specifically, the undesired light represents the scattered light causing signal interference. Therefore, the undesired light may be interfered with the resulting biometric pattern. The present invention is configured to avoid the signal interference.

Figure 5:
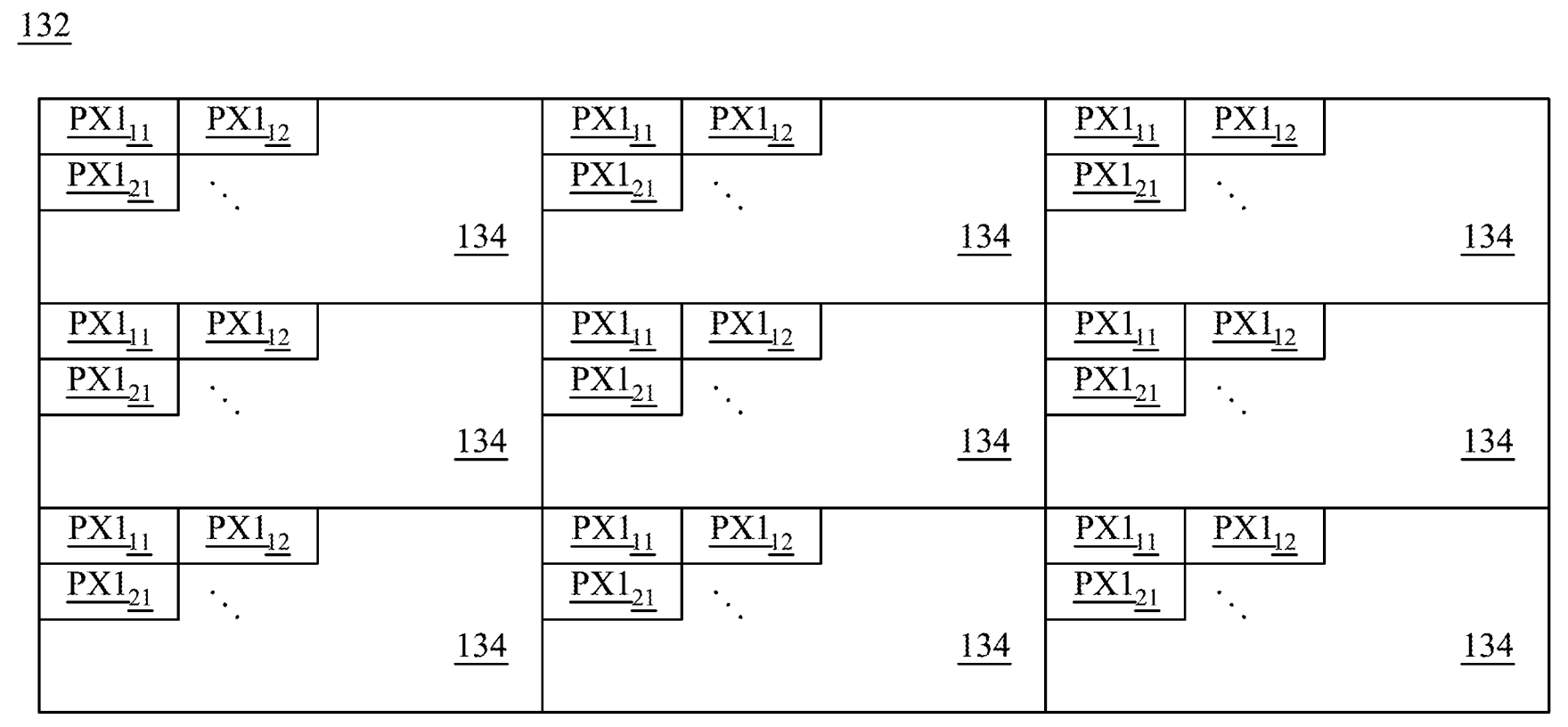

FIG. 5 is a schematic view of the biometric detecting area 132 of the display panel 130 of the display device 100 according to the embodiment of the present invention. The biometric detecting area 132 is divided into plural blocks 134, such as nine blocks 134 as shown in FIG. 5. Each of the blocks 134 has several first pixels PX1 and several corresponding photodetectors PD (not shown). The first pixels PX1 are controlled by the processor 110, and thus the light emitted by the backlight module 120 sequentially penetrates the first pixels PX1 within each of the blocks 134 in the blanking period of the display device 100. Specifically, the blanking period of the display device 100 is divided into several frames. For example, during the first frame of the blanking period of the display device 100, the light emitted by the backlight module 120 only penetrates one of the first pixels PX1 within each of the blocks, e.g., the first pixel $PX1_{11}$ located in upper left corner of each of the blocks, as shown in FIG. 5. For example, during the second frame of the blanking period of the display device 100, the light emitted by the backlight module 120 only penetrates another one of the first pixels PX1 within each of the blocks, e.g., the first pixel $PX1_{12}$ located adjacent to the first pixel $PX1_{11}$ of each of the blocks, as shown in FIG. 5.

Figure 6:
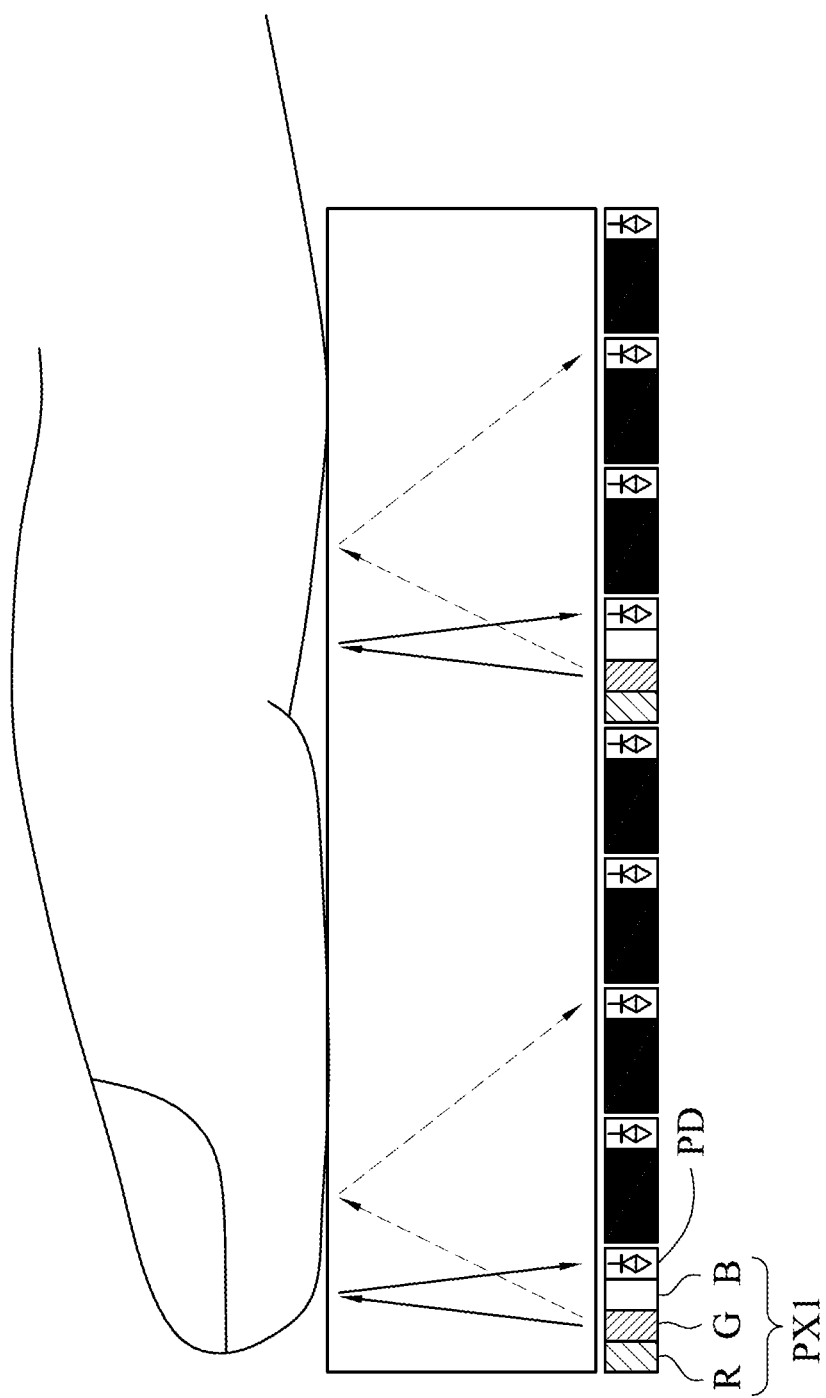
FIG. 6 is a sensing schematic diagram according to the embodiment of the present invention.

FIG. 6 is a sensing schematic diagram according to the embodiment of the present invention. As shown in FIG. 6, during one frame of the blanking period of the display device 100, the light emitted by the backlight module 120 only penetrates the target first pixel PX1 within each of the blocks, and thus the photodetector PD corresponding to the target first pixel PX1 receives the reflected light. Specifically, the light received by the photodetectors PD corresponding to the target first pixels only includes the desired light (i.e., the solid lines of FIG. 6). Therefore, the signal interference may be avoided.

As shown in FIG. 6, the other photodetectors PD which do not correspond to the target first pixels PX1 may receive the light penetrating the target first pixels PX1 (i.e., the dotted lines of FIG. 6). It is noted that the processing circuit 140, as shown in FIG. 1, only processes the photo detection signals converted from the photodetectors PD corresponding to the target first pixel during one frame of the blanking period of the display device 100. Therefore, the processing circuit 140 constructs a clear biometric pattern based on the photo detection signals.

Furthermore, in other embodiments, the first pixels PX1 and the second pixels PX2 can be organic light-emitting diode (OLED) pixels or micro light-emitting diode (microLED) pixels.

Figure 7:
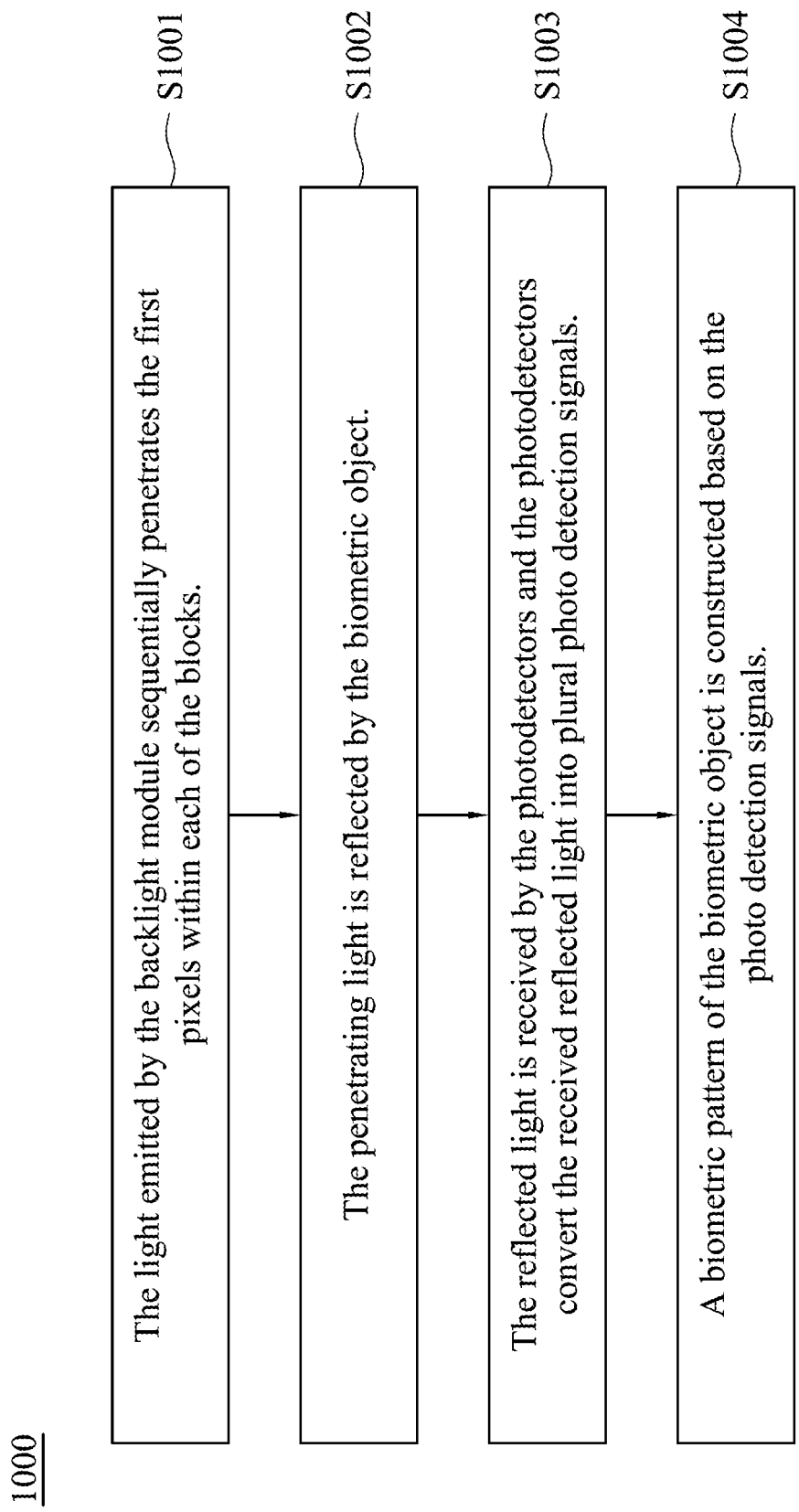
FIG. 7 is a flow chart of the biometric detection method of the display device according to the embodiment of the present invention.

FIG. 7 is a flow chart of the biometric detection method 1000 of the display device 100 according to the embodiment of the present invention. The biometric detection method 1000 includes the plural steps S1001-S1004. In step S1001, the display panel is controlled, such that the light emitted by the backlight module sequentially penetrates the first pixels within each of the blocks. In step S1002, the penetrating light is reflected by the biometric object. In step S1003, the reflected light is received by the photodetectors and the photodetectors convert the received reflected light into plural photo detection signals. In step S1004, a biometric pattern of the biometric object is constructed based on the photo detection signals.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a display panel having a biometric detecting area configured to detect a biometric pattern of a biometric object in a blanking period of the display device;
   wherein the biometric detecting area has a plurality of blocks and each of the blocks comprises a plurality of first pixels and a plurality of photodetectors adjacent to the first pixels, respectively; wherein the biometric detecting area comprises a plurality of sensing lines, wherein each of the photodetectors is selectively connected to one of the sensing lines, wherein each of the photodetectors is electrically connected to the one of the sensing lines in the blanking period of the display device,
   wherein light sequentially penetrates the first pixels within each of the blocks in the blanking period of the display device.

2. The display device of claim 1, wherein the display panel further comprises a plurality of second pixels located outside the biometric detecting area, wherein the first pixels of all the blocks and the second pixels are configured to display an image in a display period of the display device.

3. The display device of claim 2, further comprising:
   a backlight module configured to emit light penetrating the first pixels and the second pixels;
   a processor configured to control the first pixels of the display panel in the blanking period of the display device, such that the light sequentially penetrates the first pixels within each of the blocks in the blanking period of the display device.

4. The display device of claim 3, wherein during the blanking period of the display device, the light is emitted by the backlight module, and sequentially penetrates the first pixels within each of the blocks, and is reflected by the biometric object, and is received by the photodetectors within each of the blocks, and is converted into a plurality of photo detection signals.

5. The display device of claim 4, further comprising:
a processing circuit coupling to the photodetectors, wherein the processing circuit is configured to sequentially process the photo detection signals in the blanking period of the display device and construct the biometric pattern of the biometric object based on the photo detection signals.

6. The display device of claim 2, wherein each of the second pixels comprises a red subpixel, a green subpixel and a blue subpixel.

7. The display device of claim 2, wherein the second pixels are organic light-emitting diode (OLED) pixels.

8. The display device of claim 2, wherein the second pixels are micro light-emitting diode (microLED) pixels.

9. The display device of claim 1, wherein each of the first pixels comprises a red subpixel, a green subpixel and a blue subpixel.

10. The display device of claim 1, wherein the biometric pattern of the biometric object is a fingerprint.

11. The display device of claim 1, wherein the first pixels are organic light-emitting diode (OLED) pixels.

12. The display device of claim 1, wherein the first pixels are micro light-emitting diode (microLED) pixels.

13. A biometric detection method of a display device comprising a display panel, wherein the display panel has a biometric detecting area configured to detect a biometric pattern of a biometric object in a blanking period of the display device, wherein the biometric detecting area has a plurality of blocks and each of the blocks comprises a plurality of first pixels and a plurality of photodetectors adjacent to the first pixels, respectively, wherein the biometric detection method comprises:
controlling the display panel, such that light sequentially penetrates the first pixels within each of the blocks in the blanking period of the display device, wherein the biometric detecting area comprises a plurality of sensing lines, wherein each of the photodetectors is selectively connected to one of the sensing lines, wherein each of the photodetectors is electrically connected to the one of the sensing lines in the blanking period of the display device;
reflecting the light by the biometric object;
receiving the reflected light and converting the reflected light into a plurality of photo detection signals; and
constructing the biometric pattern of the biometric object based on the photo detection signals.

14. The biometric detection method of claim 13, wherein each of the first pixels comprises a red subpixel, a green subpixel and a blue subpixel.

15. The biometric detection method of claim 13, wherein the biometric pattern is constructed as a fingerprint.

16. The biometric detection method of claim 13, wherein the first pixels are organic light-emitting diode (OLED) pixels.

17. The biometric detection method of claim 13, wherein the first pixels are micro light-emitting diode (microLED) pixels.

* * * * *